US009791547B2

(12) United States Patent
Lavache

(10) Patent No.: US 9,791,547 B2
(45) Date of Patent: Oct. 17, 2017

(54) WIRELESS POSITION SENSING IN THREE DIMENSIONS USING ULTRASOUND

(75) Inventor: Steven David Lavache, Ware (GB)

(73) Assignee: Performance Designed Products LLC, Burbank, CA (US)

( * ) Notice: Subject to any disclaimer, the term of this patent is extended or adjusted under 35 U.S.C. 154(b) by 2809 days.

(21) Appl. No.: 12/294,880

(22) PCT Filed: Mar. 28, 2007

(86) PCT No.: PCT/GB2007/001101
§ 371 (c)(1),
(2), (4) Date: Oct. 21, 2010

(87) PCT Pub. No.: WO2007/110626
PCT Pub. Date: Oct. 4, 2007

(65) Prior Publication Data
US 2011/0026363 A1 Feb. 3, 2011

(30) Foreign Application Priority Data

Mar. 28, 2006 (GB) .................................. 0606130.3
Apr. 4, 2006 (GB) .................................. 0606711.0
May 9, 2006 (GB) .................................. 0609111.0

(51) Int. Cl.
*G01S 11/16* (2006.01)
*G01S 5/30* (2006.01)

(52) U.S. Cl.
CPC ................. *G01S 5/30* (2013.01); *G01S 11/16* (2013.01)

(58) Field of Classification Search
USPC ............ 367/120, 124, 128, 129; 340/539.13, 340/539.22
See application file for complete search history.

(56) References Cited

U.S. PATENT DOCUMENTS 3,641,575 A * 2/1972 Auer et al. ................. 340/12.14
3,764,964 A * 10/1973 Seeley et al. ................. 367/117
(Continued)

FOREIGN PATENT DOCUMENTS

DE 103 33 012 A1 10/2004
GB 2170907 A * 8/1986 ............. G01S 11/00
GB 2368991 A * 5/2002 ............... G01S 5/02

*Primary Examiner* — Ian J Lobo
(74) *Attorney, Agent, or Firm* — Sheppard Mullin; Daniel Yannuzzi; Jonathan Marina

(57) ABSTRACT

The present invention provides a method of position sensing between a wireless mobile component carrying a mobile ultrasonic transducer and a fixed component carrying a plurality of fixed ultrasonic transducers in a predetermined spaced-apart relationship, the method comprising turning off all the transducers to establish a period of silence, activating one or more of the fixed transducers to transmit an ultrasonic signal, starting a plurality of timers corresponding to the respective plurality of fixed transducers generally simultaneously with transmitting the signal, receiving the signal at the mobile transducer, transmitting a signal from the mobile transducer responsive to the received signal, receiving the signal transmitted by the mobile transducer at each fixed transducer and stopping the respective timer generally at the time of reception of an edge of the received signal found within the first twenty received edges and preferably within the first ten received edges and more preferably at the first received rising edge, calculating the distance between the mobile transducer and each fixed transducer based on a predetermined constant representative of the speed of sound and the time taken for transit of the signal to each fixed transducer as measured by the respective timers, and performing trigonometric calculations using the calculated distances in order to determine the 3-dimensional position of the mobile component relative to the fixed component.

11 Claims, 3 Drawing Sheets

(56) References Cited

U.S. PATENT DOCUMENTS

| | | | | |
|---|---|---|---|---|
| 4,207,571 | A | * | 6/1980 | Passey .......................... 342/464 |
| 4,751,689 | A | * | 6/1988 | Kobayashi .................... 367/127 |
| 4,991,148 | A | * | 2/1991 | Gilchrist ....................... 367/124 |
| 6,141,293 | A | | 10/2000 | Amorai-Moriya et al. |
| 6,568,281 | B1 | * | 5/2003 | Sato et al. ................. 73/861.27 |
| 7,046,141 | B2 | * | 5/2006 | Pucci et al. .............. 340/539.32 |
| 8,203,910 | B2 | * | 6/2012 | Zhao et al. ................... 367/127 |
| 2005/0030175 | A1 | * | 2/2005 | Wolfe ....................... 340/539.13 |
| 2006/0013070 | A1 | * | 1/2006 | Holm et al. .................. 367/128 |
| 2006/0077759 | A1 | * | 4/2006 | Holm ........................... 367/128 |

\* cited by examiner

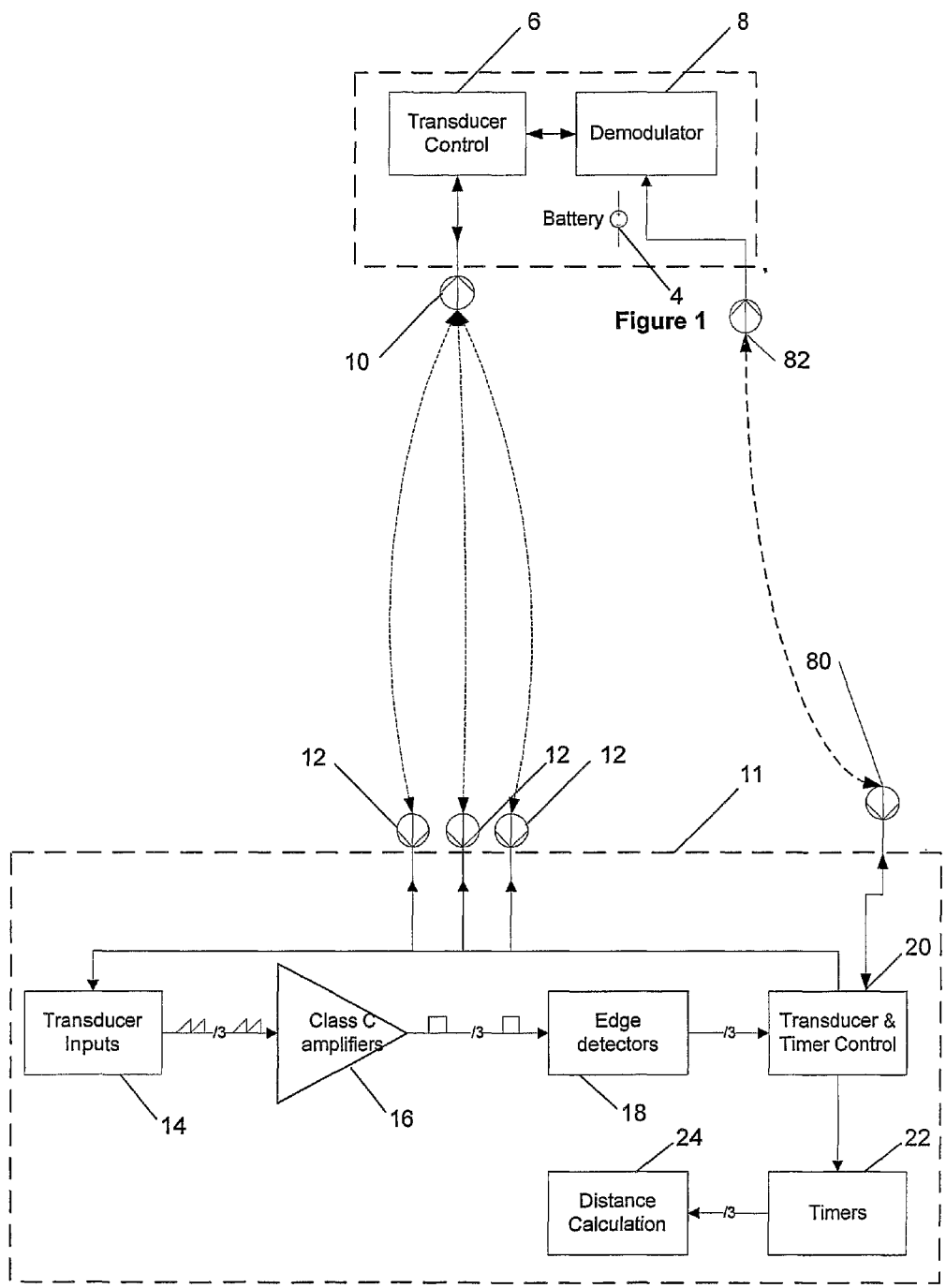

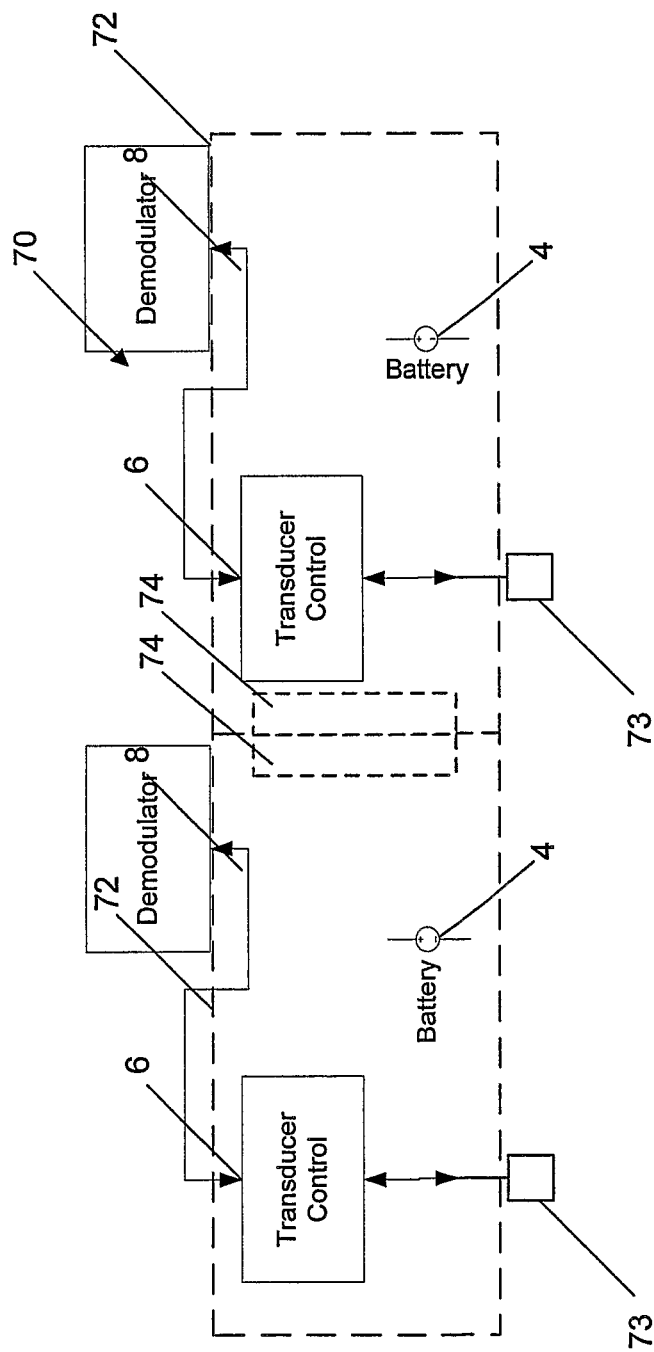

WIRELESS POSITION SENSING IN THREE DIMENSIONS USING ULTRASOUND

The present invention relates to the sensing of position in three dimensions using ultrasound and in particular to the sensing of a mobile component relative to a fixed component; the mobile component being free from connection to the fixed component by wires or cables or the like.

Many attempts have been made to sense position using ultrasound. Typically an ultrasonic emission is made from one component and is received at three or more other components. The three or more other components have a fixed spatial relationship to one another and by measuring the time of flight of the transmission to the three or more receivers, a measure of distance may be made. By using three or more receivers, the differences in time of arrival and the consequent different distance measurements allow trigonometric calculations to be carried out to determine the three dimensional relationship between the mobile and fixed components. Thus far, the theory of ultrasound position sensing is well understood and stands up to close scrutiny.

However, the practicalities of achieving this theoretical goal present several significant obstacles. Firstly, the time of commencement of transmission must accurately be known in order to measure the time of flight of the signal. In a wireless embodiment, this must be achieved without interfering with the signal itself. Secondly, this type of apparatus is frequently used inside buildings. Thus the transmitted signals undergo reflections from internal walls and furniture surfaces and the receivers therefore must distinguish between original and reflected signals in order to accurately determine the time of flight. Thirdly, the absolute time of flight varies according to the characteristics of the air and in particular according to its temperature and pressure. Fourthly, it is desirable that the ultrasound emissions do not cause annoying emissions in the audible frequency range. Of course, these problems must also be solved within the usual constraints of cost and reliable operation.

The invention described below being intended for the computer and console games market is particularly sensitive to the latter constraints of cost and reliability. Thus the invention described below provides a particularly simple, robust and yet highly effective method and apparatus for determining position in three dimensions using ultrasound and without using a wired connection between a fixed component and a mobile component.

U.S. Pat. No. 5,142,506 contains a detailed description of the problems outlined briefly above. The apparatus described therein includes a wired mobile component and seeks to overcome the problem of detecting arrival of the transmitted signal using a complex combination of the resonance characteristics of the transducers and complex circuitry in order to find a zero crossing following the second received cycle above a predetermined amplitude.

U.S. Pat. No. 5,175,695 discloses position detecting apparatus in which arrival of the transmitted signal is carried out using a complex envelope detection and threshold circuit. Activation of a known mobile unit is carried out by transmitting a burst of ultrasound. Calibration is carried out using an air temperature sensor. This device represents a complex and expensive approach to the problems set out above.

EP 0312481 approaches the problem of activating a mobile component by the use of infrared transmissions. This, of course, adds complexity relative to the ultrasonic embodiment of U.S. Pat. No. 5,175,695 and also requires a line of sight provision between the fixed and mobile components.

Hitherto, none of the prior art solutions to the problem of wireless three dimensional position sensing using ultrasound have produced a comprehensive and yet simple solution to the many difficulties which must be overcome in this field of technology.

According to one aspect of the present invention there is provided a method of position sensing between a wireless mobile component carrying a mobile ultrasonic transducer and a fixed component carrying a plurality of fixed ultrasonic transducers in a predetermined spaced-apart relationship, the method comprising turning off all the transducers to establish a period of silence, activating one or more of the fixed transducers to transmit an ultrasonic signal, starting a plurality of timers corresponding to the respective plurality of fixed transducers generally simultaneously with transmitting the signal, receiving the signal at the mobile transducer, transmitting a signal from the mobile transducer responsive to the received signal, receiving the signal transmitted by the mobile transducer at each fixed transducer and stopping the respective timer generally at the time of reception of an edge of the received signal found within the first twenty received edges and preferably within the first ten received edges and more preferably at the first received rising edge, calculating the distance between the mobile transducer and each fixed transducer based on a predetermined constant representative of the speed of sound and the time taken for transit of the signal to each fixed transducer as measured by the respective timers, and performing trigonometric calculations using the calculated distances in order to determine the 3-dimensional position of the mobile component relative to the fixed component.

Thus the present invention achieves activation of the mobile component by transmitting an ultrasonic signal from the fixed component. This is particularly simple since it requires no additional components as the transducers may be used both in transmit and receive mode. Once the mobile component is transmitting, the signal is received by each of the transducers at the fixed component and a simple edge detection is carried out. This is preferably a detection of the first rising edge but may be a selected edge within the first 10 or 20 cycles. No envelope detection is required to be carried out and reflections are avoided by ensuring that all transducers are turned off prior to transmission to allow reflections to die down.

In another embodiment, the fixed component and the mobile component include radio frequency transducers and are able to communicate using radio. Thus in another aspect, the invention comprises a method of position sensing between a wireless mobile component carrying a mobile ultrasonic transducer and a first rf transducer and a fixed component carrying a plurality of fixed ultrasonic transducers in a predetermined spaced-apart relationship and a second rf transducer, sending an rf trigger signal form the second rf transducer, starting a plurality of timers corresponding to the respective plurality of fixed transducers generally simultaneously with transmitting the trigger signal, receiving the trigger signal at the mobile transducer, transmitting a signal from the mobile transducer responsive to the received trigger signal, receiving the signal transmitted by the mobile ultrasonic transducer at each fixed ultrasonic transducer and stopping the respective timer generally at the time of reception of an edge of the received signal found within the first twenty received edges and preferably within the first ten received edges and more preferably at the first received rising edge, calculating the distance between the mobile transducer and each fixed transducer based on a predetermined constant representative of the speed of sound and the time taken for transit of the signal to each fixed transducer as measured by the respective timers, and performing trigonometric calculations using the calculated distances in order to determine the 3-dimensional position of the mobile component relative to the fixed component.

In a preferred embodiment, the ultrasonic signal received at the fixed component is clipped for example, by using relatively high gain class C amplifiers or threshold adjustable comparators, in order to further simplify the detection of edges of the received signal. This avoids the need for complex additional signal processing or complex analogue signal processing as proposed in the prior art.

It will be appreciated by those skilled in the art that the system may be used in a reverse mode in which the plurality of ultrasonic transducers are located on the mobile component and the single ultrasonic transducer is located on the fixed component. Generally however, weight and battery power constraints will suggest that the plurality of transducers be located on the fixed component. Nevertheless it should be appreciated that the invention will work equally well in either configuration and in the context of the whole of this application, both alternatives are envisaged.

In accordance with a further aspect of the invention there is provided a method of position sensing using a wireless mobile component carrying an ultrasonic transducer and a fixed component carrying a plurality of ultrasonic transducers in a predetermined spaced-apart relationship, the method including selecting the said mobile component from a plurality of similar mobile components by modulating an ultrasonic signal transmitted by the fixed component with a unique code selected from a predetermined set of codes, and arranging for the mobile component to be responsive to a subset of, and preferably only one of, the codes from the said set of codes.

This aspect of the invention deals with an enhancement which allows multiple mobile components to be used with the same fixed component. When modulating an identity signal onto the signal transmitted by the one or more fixed transducers, only one of the mobile components may be arranged to respond. By polling a plurality of mobile transducers in order, it is possible to determine the position of a plurality of such mobile transducers relative to a single fixed component of the system. EP 0152905 attempts to carry out something similar in a medical context. However it is to be noted that this system includes an umbilical chord attached to the person carrying the transducer and thus this system is not a wireless system.

In a further method aspect, there is provided a method of calibrating an ultrasonic position sensing arrangement having a fixed component carrying a plurality of ultrasonic transducers in a predetermined spaced-apart relationship, the method comprising activating a first and second of the fixed transducers, transmitting an ultrasonic signal from the first to the second transducer, measuring the time taken for the ultrasonic signal to travel from the first to the second transducer and deducing a first calibration measure based on the known distance between the transducers and the measured time.

In this enhanced embodiment, self-calibration is carried out using the known spatial relationship between the plurality of transducers on the fixed component. The prior art approach has typically taken the form of using expensive temperature and barometric pressure sensors. Whilst some prior art solutions have involved a self-calibration feature, these have tended to involve calibration between the mobile component (placed in a cradle of known position) and the fixed component. The averaging of several measurements across several of the transducers on the fixed components has been found to produce significant enhancements in accuracy.

In a further embodiment, there is provided an ultrasonic position sensor arrangement having a fixed component carrying a plurality of fixed ultrasonic transducers in a predetermined spaced-apart arrangement and a wireless mobile component carrying a mobile ultrasonic transducer, the fixed component including a plurality of Class C amplifiers coupled to the respective outputs of the fixed transducers, and a plurality of timers arranged to be triggered by respective outputs of the class C amplifiers.

In a further aspect of the invention there is provided a mobile component comprising at least two members, each member being connectable to another member using attachment means and the mobile component including communications means for transmitting information to a fixed unit. Preferably, the attachment means is magnetic coupling, a hook and loop fastener or a mechanical fastener or clip. The communications means may be a mobile ultrasonic transducer or radio frequency transducer. Preferably, the fixed component is adapted to determine the position of each mobile component according to information transmitted by the communications means.

The members may also include a detecting means adapted to determine whether the member is connected to another member and cause only one member to transmit an ultrasonic and/or rf signal when two or more members are connected.

In a preferred embodiment, one of the said members takes on a master role in which it solely undertakes rf communication with the fixed unit and the one or more other members communicate locally using rf and/or ultrasonic transmissions with the master member. This saves battery power since only one member need transmit and receive at sufficient power to communicate with the fixed component which typically will be at a greater distance from the master member than the distance between the members. The master member may include a data buffer to store information before it is possible to transmit it to another member or to the fixed component.

The mobile component or one or more members of the mobile component may include rotational sensors such as one or more accelerometer and/or gyroscopic/compass sensor. Accelerometer or other rotational data and or button presses on the mobile component may be relayed back to the fixed component using rf or ultrasonic transmissions.

Embodiments of the invention will now be described by way of example with reference to the figures in which:

FIG. 1 is a schematic block diagram of a mobile component in accordance with the invention;

FIG. 2 is a schematic block diagram of a fixed component in accordance with the invention.

FIG. 4 is a schematic block diagram of a mobile component in accordance with a second embodiment of the invention.

Figure 3:
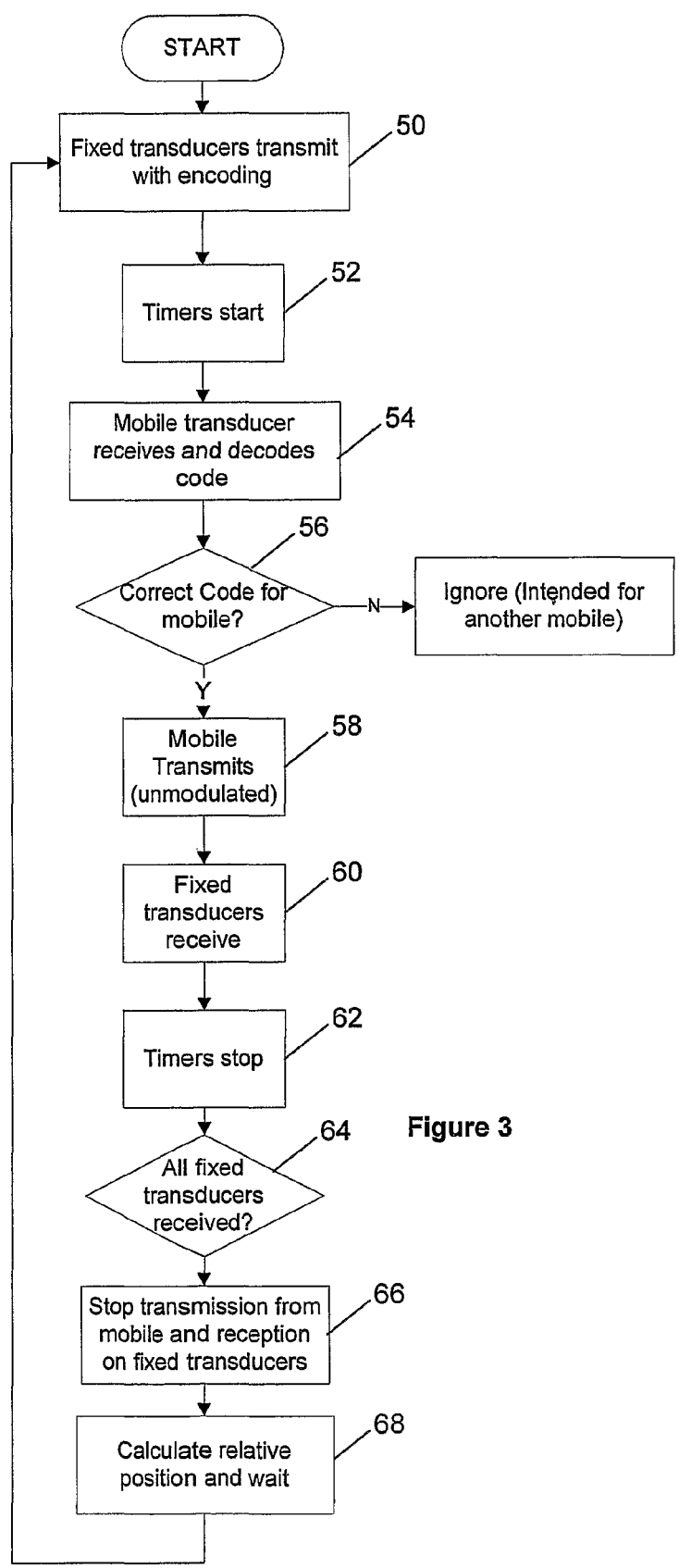
FIG. 3 is a flow chart showing the steps taken during position measurement.

With reference to FIG. 1, a mobile component 2 has a battery power supply 4, a transducer controller 6 and a demodulator 8.

A single transducer 10 is coupled to the transducer controller 6.

The transducer 10 is arranged to have a wide dispersal angle typically greater than 30° and preferably greater than 60°. Typically the transducer is arranged to transmit at around 40 kHz. As is know in the art, such transducers are therefore suitable for reception at around the same frequency. The frequency choice is not critical although lower frequencies will tend to disperse more, broadly which is favourable. However, with the hearing range of human ears sometimes extending close to 20 kHz, frequencies of around 25 kHz should be considered to be a minimum usable frequency.

The transducer controller 6 serves to control the transmission, reception and idle modes of the transducer 10 and also to deal with the necessary amplification and buffering. The demodulator 8 is arranged to demodulate and recognise unique ID codes received by the transducer 10 as explained in more detail below.

With reference also to FIG. 2, a fixed component 11 has a plurality of transducers 12 which typically will be of the same construction as the transducer 10. Typically four transducers 12 will be used which provides 4 possible triangulation solutions which may then be averaged or otherwise processed, for improved accuracy. Only three transducers may be used (providing a single triangulation solution) if lesser accuracy is required and this option is encompassed, in the present application. More than four transducers may also be used; providing further increased accuracy but at greater manufacturing cost.

The transducers 12 in one embodiment, are intended to be used both in transmit and receive modes as explained in more detail below. When in receive mode, the inputs are received by unit 14, are passed to a high gain amplifier in Class C operation 16 which serves to clip the incoming waveform to produce a generally square waveform which is then passed to edge detector 18. Transducer and timer control unit 20 serves to control the transmit, receive and idle modes of the transducers 12 and also to activate and deactivate a plurality of timers 22. Finally, a distance calculator 24 is used to perform the final calculations used for position sensing.

The detailed operation of these components is now described in connection with FIG. 3.

As a starting point, all transducers are idle. Upon initialisation, a self-calibration phase is entered in which one of the transducers 12 is caused to transmit a signal which is received at the other two transducers 12. The transducers 12 are mounted on a structure in such a way that their spatial relationship is constant and also is known. By measuring the time taken for the signal to arrive at the other two transducers 12 using the transducer timer and control unit 20 and timers 22, an estimate representative of the speed of sound in the vicinity of the fixed unit 11 may be made. This allows the effects of temperature and pressure changes to be calibrated out of future calculations.

The use of one transmission received at two places provides two different results. Ultimately, these are averaged to arrive at a final calibration figure to be used for future calculation. Further optimally, another of the transducers 12 or indeed all three of the transducers 12 may be used in sequence to transmit a signal to be received at the remaining two of the transducers. This may provide up to six measurements which may be averaged.

Once the initial calibration phase has completed, a measurement phase may then commence. Typically this will be used for a user calibration in which the origin for further measurements is set thereby allowing for placement of the fixed component relative to a comfortable position for the user to hold the mobile component.

With reference to FIG. 3, in step 50, the fixed transducers 12 start to transmit a short burst of ultrasound. Typically this will be eight cycles of ultrasound and is typically amplitude modulated to include a multi-bit (typically 8 bit) binary digit as an identity code. At the same time, the transducer and control unit 20 causes the timers 22 to start (step 52).

The mobile component 2 receives the transmitted signal and using demodulator 8, decodes the identity code (step 54). The identity code is used to allow for multiple mobile components to be used with the same fixed components. Thus the mobile component 2 determines whether the identity code indicates that it should perform transmission. The identity code may also be used to indicate certain modes within the mobile component which might for example be used to activate vibration equipment, sound on the mobile unit and/or lighting effects on the mobile component.

Let us assume that the identity code which has been transmitted is the correct one for an active mobile component. (This is sensed at step 56). If the mobile component 2 is active, an unmodulated burst of ultrasound is transmitted (step 58). This typically will be a burst of eight cycles.

The burst is received by the fixed transducer (step 60) at different times due to their different proximity to the mobile component. As each fixed transducer receives a signal, the transducer and timer control turns off the relevant timer (step 62). Once all the fixed transducers have received a signal (step 64) transmission from the mobile component is stopped by transmitting a stop signal from the transducers 12 to the transducer 10 and distance calculator 24 calculates the relative position of the components using the values stored in the timers 22 against each transducer, as a measure of distance. The position sensing is determined using trigonometric calculations known in the art.

The stopping of transmission (step 66) from the mobile component may be achieved by causing the mobile component to look for signals transmitted by the transducers 12 between its own transmissions.

Preferably the transducer and time control 20 uses the first edge detected by the edge detectors 18 to trigger stopping of a timer 22 in relation to a particular transducer 12. This is a particularly simple method and is facilitated by the use of the clipping (using the Class C amplifier 16) on the received signal. It is also assumed that the first received signal is the direct line of sight signal since typically a reflected signal will take longer to arrive. Thus simply choosing the first edge avoids the need for complex calculations to achieve removal of multipath reflection. By repeating the cycle of FIG. 3 at least 100 times a second, the impression of continuous motion detection is given. If multiple mobile components were used, these are polled in series (unless of course a particular mobile component is known to have a lower requirement for responsiveness in which case it may be polled less frequently). Also, the mobile component may be simplified so that it does not look for a stop signal. It may simply transmit eight cycles and then automatically stop.

Although some silence is required in order to allow reflections to die away, it will be noted that with eight cycles of 40 kHz ultrasound repeating at something of the order of 100 Hz, there is sufficient time for approximately 100 mobile components to be serviced. In practice the number is more likely to be between 1 and 10. Furthermore, the choice of an eight bit identification code allows for 256 combinations which as discussed above may be formed as 256 different mobile components or may be used to address a smaller number of mobile components whilst activating and deactivating features on the mobile components.

Thus what has been presented above is a particularly simple and effective solution to the problem of three-dimensional position sensing in a wireless context and using ultrasound.

The accuracy of position determination is largely dictated by the resolution of the timers 22 which in turn is dictated by the clock frequency. Presently, a clock frequency of 6.5 MHz has been found to be suitable. Enhanced resolution may be achieved using higher clock frequencies but at the cost of requiring larger counters.

In a further embodiment of the present invention the mobile component 70 is made up from two or more members 72 as illustrated in FIG. 4. Each member 72 includes communication means 73 which is adapted to transmit information to the fixed component and a user interface for receiving instructions from a user.

The communication means 73 may be, for example, a transmitter adapted to transmit information received via the user interface to the fixed component using a wire. Alternatively, each member may be analogous to the mobile component described with reference to FIG. 1 and, having a battery power supply 4, a transducer controller 6 and a demodulator 8. Thus the communication means 73 may be an ultrasonic transducer and/or an if transducer. Furthermore, one of the members 72 may become a master member which communicates directly with the fixed component 11. If a master member has been designated then the other members will communicate with the fixed component via the master member so that the master member operates in the nature of a local hub for all members 72.

Preferably, the members 72 are removably connected by attachment means 74. The attachment means allow the members 72 to readily be connected to form a single mobile component or detached to form two separate mobile components. The attachment means may be, for example, one or more magnets or a hook and loop fastener such as Velcro®. Alternatively, each of the members 72 may be provided with complementary parts of a clip that fasten together to hold the members together. Any other suitable attachment means may be used.

As each member 72 is provided with a battery power supply 4, a transducer controller 6 and a demodulator 8 each member is able to independently transmit to a fixed component (not shown). The fixed component can, therefore, determine the position of each of the members 72 using the identity encoded within the signal as described with reference to FIG. 3.

Preferably, the members 72 are provided with a sensor (not shown) that detects when the member is attached to another member. This enables only one signal to be transmitted by members that are attached together.

In a further embodiment, the communication between the fixed and mobile component is achieved using radio frequency (rf) communication. Thus in FIG. 3, the step of transmitting (step 50) involves an rf communication to the mobile component and the reception step (step 54) involves rf reception.

As shown in FIG. 1, the fixed component 11 includes an optional rf transducer 80 and the mobile component includes an optional if transducer 82.

The mobile component may also include one or more accelerometer and/or gyroscopic/compass sensors. This allows acceleration information and also twisting motions of the mobile component to be detected, measured and transmitted back to the fixed component using wireless transmissions such as rf or ultrasonic transmissions.

As a further enhancement, the acceleration of the mobile component may be used to adjust error averaging of the position detection. Generally, in order to minimise the effect of errors, the sensed position of the mobile component is averaged over several readings. This averages out errors and provides a smooth position reading. However, the averaging also intrudes delay which is noticeable when the mobile component is being moved rapidly. By using the accelerometer data, this problem may be overcome by reducing the number of samples used for averaging when the mobile component is accelerating above a predetermined threshold or set of thresholds (which may correspond to respective variations in the number of samples used for averaging) and then increasing the number of samples averaged again when the acceleration of the mobile component is lower. This works well because accuracy of position detection is subjectively less important when rapid movement is occurring and in contrast an increased delay in position reading is less important when movement is slow.

The invention claimed is:

1. A method of position sensing between a wireless mobile component carrying a mobile ultrasonic transducer and a first rf transducer and a fixed component carrying a plurality of fixed ultrasonic transducers in a predetermined spaced-apart relationship and a second rf transducer, comprising:
    transmitting an rf trigger signal from the second rf transducer,
    starting a timer for each of the plurality of fixed transducers simultaneously with transmitting the rf trigger signal,
    receiving the rf trigger signal at the first rf transducer,
    transmitting a signal from the mobile ultrasonic transducer responsive to the received rf trigger signal,
    receiving the signal transmitted by the mobile ultrasonic transducer at each fixed ultrasonic transducer and stopping the timer of each fixed ultrasonic transducer at the time the transducer receives an edge of the signal,
    calculating a distance between the mobile ultrasonic transducer and each fixed ultrasonic transducer based on the speed of sound and the time measured by the fixed ultrasonic transducer's timer, and
    performing trigonometric calculations using the calculated distances in order to determine the 3-dimensional position of the mobile component relative to the fixed component;
    wherein the signal transmitted by the second rf transducer is modulated to embed a unique code selected from a predetermined set of codes, and wherein the first rf transducer is responsive only to a received signal containing a predetermined subset of the set of codes, the predetermined subset including the unique code; and
    wherein each of the codes of the predetermined subset of the set of codes is used to indicate a mode of operation of the mobile component, the mode of operation including at least one of vibration equipment activation, sound activation, or lighting effect activation.

2. The method of claim 1, further comprising clipping the signal received by the fixed ultrasonic transducers to produce a substantially square waveform.

3. A method of position sensing using a wireless mobile component carrying an ultrasonic transducer and a fixed component carrying a plurality of ultrasonic transducers in a predetermined spaced-apart relationship, the method comprising:
    selecting the mobile component from a plurality of similar mobile components by modulating a signal transmitted by the fixed component with a unique code selected from a predetermined set of codes; and configuring the mobile component to be responsive to a predetermined subset of the codes from the predetermined set of codes;

wherein each of the codes of the predetermined subset of the set of codes is used to indicate a mode of operation of the mobile component, the mode of operation including at least one of vibration equipment activation, sound activation, or lighting effect activation.

4. The method of claim 3, wherein the modulation is amplitude modulation.

5. The method of claim 4, wherein the modulation is carried over 8 cycles of the signal and each cycle represents a single bit of an 8 bit binary number.

6. A method of position sensing using a wireless mobile component carrying an ultrasonic transducer and a fixed component carrying a plurality of ultrasonic transducers in a predetermined spaced-apart relationship, the method comprising:

selecting the mobile component from a plurality of similar mobile components by modulating a signal transmitted by the fixed component with a unique code selected from a predetermined set of codes;

configuring the mobile component to be responsive to a predetermined subset of the codes from the predetermined set of codes;

transmitting an ultrasonic signal from one or more of the fixed component's ultrasonic transducers;

receiving the transmitted signal at the mobile component's ultrasonic transducer;

transmitting in cycles a signal from the mobile component's ultrasonic transducer responsive to the received signal; and listening between the mobile component's ultrasonic transducer signal transmission cycles for a turn-off signal from one of the fixed component's ultrasonic transducers, the turn-off signal configured to cause the mobile component's ultrasonic transducer to stop transmitting signals;

wherein each of the codes of the predetermined subset of the set of codes is used to indicate a mode of operation of the mobile component, the mode of operation including at least one of vibration equipment activation, sound activation, or lighting effect activation.

7. A method of position sensing using a wireless mobile component carrying an ultrasonic transducer and a fixed component carrying a plurality of ultrasonic transducers in a predetermined spaced-apart relationship, the method comprising:

selecting the mobile component from a plurality of similar mobile components by modulating a signal transmitted by the fixed component with a unique code selected from a predetermined set of codes; and configuring the mobile component to be responsive to a predetermined subset of the codes from the predetermined set of codes;

wherein the mobile component is configured to stop transmitting signals after a predetermined number of signal cycles; and wherein each of the codes of the predetermined subset of the set of codes is used to indicate a mode of operation of the mobile component, the mode of operation including at least one of vibration equipment activation, sound activation, or lighting effect activation.

8. A method of position sensing between a wireless mobile component carrying a mobile ultrasonic transducer and a first rf transducer and a fixed component carrying a plurality of fixed ultrasonic transducers in a predetermined spaced-apart relationship and a second rf transducer, comprising:

transmitting an rf trigger signal from the second rf transducer, starting a timer for each of the plurality of fixed transducers simultaneously with transmitting the rf trigger signal, receiving the rf trigger signal at the first rf transducer, transmitting a signal from the mobile ultrasonic transducer responsive to the received rf trigger signal, receiving the signal transmitted by the mobile ultrasonic transducer at each fixed ultrasonic transducer and stopping the timer of each fixed ultrasonic transducer at the time the transducer receives an edge of the signal, calculating a distance between the mobile ultrasonic transducer and each fixed ultrasonic transducer, each calculated distance based on the speed of sound and the time measured by the fixed ultrasonic transducer's timer, and performing trigonometric calculations using the calculated distances in order to determine the 3-dimensional position of the mobile component relative to the fixed component, and repeating the position sensing method at least one hundred times a second, wherein the signal transmitted by the second rf transducer is modulated to embed a unique code selected from a predetermined set of codes, and wherein the first rf transducer is responsive only to a received signal containing a predetermined subset of the set of codes, the predetermined subset including the unique code; and wherein each of the codes of the predetermined subset of the set of codes is used to indicate a mode of operation of the mobile component, the mode of operation including at least one of vibration equipment activation, sound activation, or lighting effect activation.

9. A method of position sensing between a wireless mobile component carrying a mobile ultrasonic transducer and a fixed component carrying a plurality of fixed ultrasonic transducers in a predetermined spaced-apart relationship, the method comprising:

turning off all the transducers to establish a period of silence, transmitting a first ultrasonic signal from one or more of the fixed transducers, starting a timer for each of the plurality of fixed transducers simultaneously with transmitting the first ultrasonic signal, receiving the first ultrasonic signal at the mobile transducer, transmitting a second ultrasonic signal from the mobile transducer responsive to the received first ultrasonic signal, receiving the second ultrasonic signal transmitted by the mobile transducer at each fixed ultrasonic transducer and stopping the timer at the time the transducer receives an edge of the signal, calculating a distance between the mobile transducer and each fixed transducer, each calculated distance based on the speed of sound and the time measured by the fixed ultrasonic transducer's timer, and performing trigonometric calculations using the calculated distances in order to determine the 3-dimensional position of the mobile component relative to the fixed component, wherein the first ultrasonic signal is modulated to embed a unique code selected from a predetermined set of codes, and wherein the mobile ultrasonic transducer is responsive only to a received signal containing a predetermined subset of the set of codes, the predetermined subset including the unique code; and wherein each of the codes of the predetermined subset of the set of codes is used to indicate a mode of operation of the mobile component, the mode of operation including at least one of vibration equipment activation, sound activation, or lighting effect activation.

10. The method of claim 9, further comprising clipping the second ultrasonic signal received by the fixed ultrasonic transducers to produce a substantially square waveform.

11. The method of claim 10, wherein several mobile components may be used with a single fixed component.

* * * * *